United States Patent [19]

Law

[11] Patent Number: 4,943,112
[45] Date of Patent: Jul. 24, 1990

[54] CHILD'S COLLAPSIBLE CAR SEAT

[76] Inventor: Norman Law, 6 Galloway Road, Sherwood Park, Alberta, Canada, T8A 3K8

[21] Appl. No.: 387,782

[22] Filed: Aug. 1, 1989

[30] Foreign Application Priority Data

Aug. 4, 1988 [CA] Canada .................................. 573895

[51] Int. Cl.⁵ .............................................. A47C 15/00
[52] U.S. Cl. .................................. 297/238; 297/467; 297/488; 297/112
[58] Field of Search ............... 297/238, 250, 487, 488, 297/467, 112

[56] References Cited

U.S. PATENT DOCUMENTS

| | | | |
|---|---|---|---|
| 4,540,216 | 9/1985 | Hassel, Sr. ........................... | 277/238 |
| 4,596,420 | 6/1986 | Vaidya ............................. | 297/238 X |
| 4,664,443 | 5/1987 | Casale ................................. | 297/238 |
| 4,690,455 | 9/1987 | Bailey et al. ........................ | 297/238 |
| 4,749,229 | 6/1988 | Dorto ................................. | 297/238 |
| 4,756,573 | 7/1988 | Simin et al. ..................... | 297/238 X |

FOREIGN PATENT DOCUMENTS

| | | | |
|---|---|---|---|
| 258194 | 3/1988 | European Pat. Off. ............ | 297/238 |
| 3716038 | 12/1987 | Fed. Rep. of Germany ...... | 297/238 |
| 2023415 | 1/1980 | United Kingdom ................ | 297/238 |

*Primary Examiner*—Peter R. Brown
*Attorney, Agent, or Firm*—George H. Dunsmuir

[57] ABSTRACT

Because of the complicated structure and expense, collapsible seats for use by children in automobiles are a rarity. A simple device of this type includes a pair of cushioned panels hingedly interconnected end-to-end which normally define a portion of a conventional backrest in an automobile, the panels being releasably retained in a stored position in a recess in the backrest for folding outwardly and downwardly to define a child's seat on the seat portion of the automobile seat, and a chest protector/armrest which is normally stored in a vertical position above the seat, and which is rotatable to a position in front of the child.

9 Claims, 7 Drawing Sheets

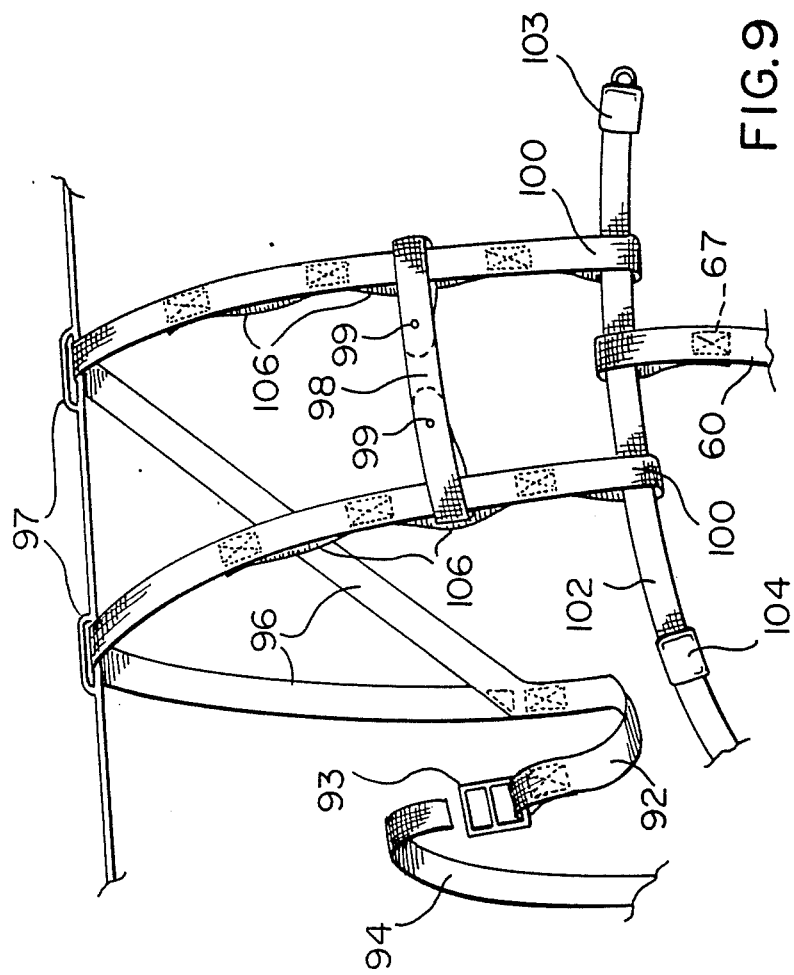

4,943,112

CHILD'S COLLAPSIBLE CAR SEAT

BACKGROUND OF THE INVENTION

This invention relates to a seat device for use in automobiles, and in particular to a child's collapsible seat device.

In general, automobile seats for children are removable structures, which are held on an automobile seat by a conventional lap buckle. As most parents will tell you, such children's seats are difficult to carry (usually with a young child or infant already in the seat), or if left in the automobile for use by an older child occupY large seat areas.

In the past, attempts have been made to incorporate a child's seat in the backrest of an automobile seat. Examples of such attempts are described, for example in U.S. Pat. Nos. 3,094,354, which issued to R. J. Bernier on June 18, 1963; 3,168,346, which issued to C. W. Rei, Jr. on Feb. 2, 1965 and 3,506,301, which issued to A. J. Van Santen on Apr. 14, 1970. In general, the patented structures are either suitable for very small children only, or are unduly complicated and consequently expensive to produce and install.

The object of the present invention is to overcome the disadvantages of the prior art devices by providing a relatively simple child's seat device, which can be stored in the backrest of an automobile seat, forming a portion of such backrest, and which can easily be moved from the stored to the use position with a minimum of effort.

SUMMARY OF THE INVENTION

Accordingly, the present invention relates to a collapsible child's seat device for use on a conventional automobile seat of the type including a seat portion and a backrest, said device comprising foldable panel means for defining a seat and a backrest; first catch means for releasably retaining said panel means in the stored position, in which said panel means defines a planar portion of the automobile seat backrest; first hinge means for pivotally connecting the bottom end of said panel means from the rest to a use position in which the panel means is folded onto the automobile seat portion to define a child's seat raised above the level of the automobile seat portion.

BRIEF DESCRIPTION OF THE DRAWINGS

The invention will be described in greater detail with reference to the accompanying drawings, which illustrate a preferred embodiment of the invention, and wherein:

FIG. 9 is a schematic, perspective view of a shoulder strap for use with the device of FIGS. 1 to 3.

DESCRIPTION OF THE PREFERRED EMBODIMENT(S)

Figure 1:
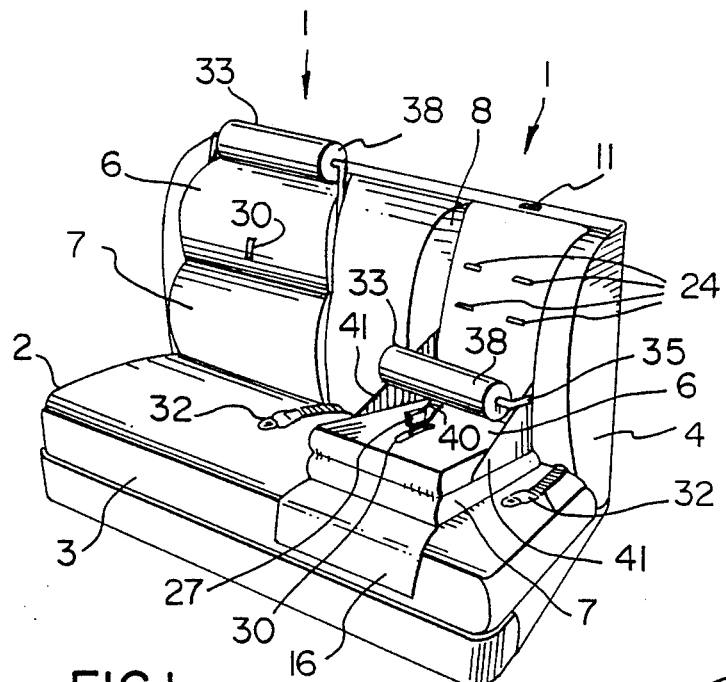
FIG. 1 is a schematic, perspective view of a conventional automobile seat incorporating two devices in accordance with the present invention.

It will be appreciated that certain obvious inaccuracies appear in the drawings. However, such inaccuracies are deemed to facilitate understanding of the invention.

Referring to the drawing the seat device of the present invention which is generally indicated at 1 is intended for use on a conventional automobile seat 2 of the type including a seat portion 3 and a backrest 4. The device 1 replaces a portion of the backrest 4 and in the stored or non-use position (on the lefthand side of FIG. 1) is more or less completely housed in the backrest 4.

Figure 2:
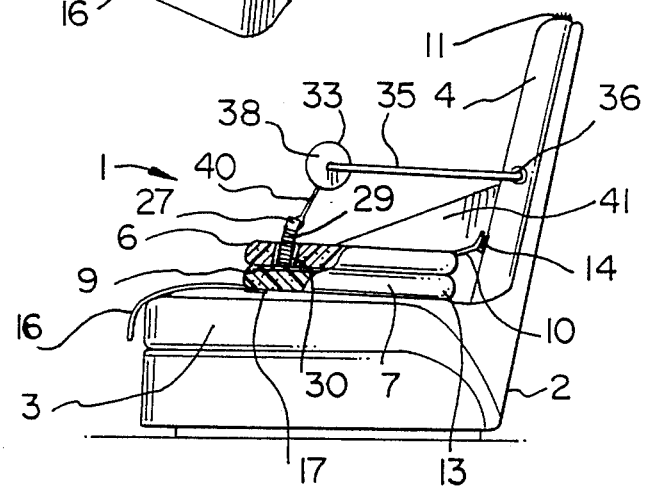
FIG. 2 is a schematic, partly sectioned, side view of the automobile seat and the device of FIG. 1 in the us position.

The seat device is defined by a pair of cushions 6 and 7, hingedly interconnected in end-to-end relationship to fill a recess 8 in the backrest 4 when the device is in the stored position. The outer surfaces of the cushions 6 and 7 (in the stored position) preferably have profiles matching the seat profile, i.e. the cushions have the same shape as the front surface of the backrest, so that the cushions 6 and 7 can be used as a backrest. However, as shown on the left in FIG. 1, the cushions 6 and 7 can be convex. The inner surfaces of the cushions 6 and 7 include hardboard or plastic reinforcing panels 9 (FIG. 2). The seat device 1 is normally installed in the rear passenger seat of a motor vehicle. While two such devices 1 are shown, it will be appreciated that from one to three of the devices can be installed in a bench type automobile seat 2, or one device in a bucket seat. The cushions 6 and 7 are retained in the stored position by a catch defined by a strip 10 (FIG. 3) with VELCRO (trademark) hooks on the top cushion 6 thereon for engaging a VELCRO fabric path 11 on the top of the backrest 4.

The device 1 is moved from the stored position (on the left in FIG. 1 and FIG. 3) to the use position (on the right in FIG. 1 and FIG. 2) by folding the cushion 7 forwardly and downwardly. The cushion 6 follows, and folds downwardly and rearwardly into overlapping relationship with the cushion 7 to define a seat. The bottom or inner end 13 of the cushion 7 is pivotally connected to the inner or rear end of the seat portion 3 of the automobile seat 2. The device 1 is retained in the use position by the VELCRO strip 10 and a looped fabric patch 14 on the backrest 4. A seat cover defined by a fabric panel 16 (FIGS. 1 and 2) is releasably connected to the outer bottom end of the cushion 7 (in the use position) by a VELCRO tab 17. The panel 16 overlaps and protects the front edge of the automobile seat 2 when the device 1 is in the use position.

Figure 4:
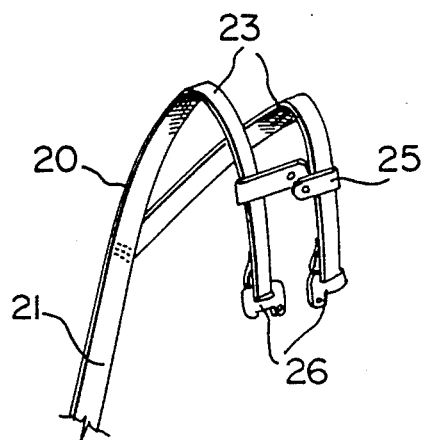
FIG. 4 is a schematic, perspective view of a shoulder strap for use with the seat device of FIGS. 1 to 3.

A child (not shown) is retained in the seat device 1 by a shoulder harness 20 (FIG. 4). The harness 20 includes a strap 21 connected to the floor (not shown) of the automobile, and a pair of shoulder straps 23, which extend through slots 24 (FIG. 1) in the automobile seat backrest 4. More than one pair of slots 24 are provided for accommodating children of various heights. In use, the straps 23 are interconnected by a short strap 25 extending across the chest of the child. Buckle inserts 26 are provided on the outer free ends of the straps 23 for connecting the latter to a buckle socket 27. The socket 27 is attached to the outer free end of a strap 29 which is permanently connected to the inner surface of the cushion 7. In the use position, the strap 29 extends upwardly through a slot 30 in the cushion 6, so that the socket 27 is in position to receive the inserts 26. Alternatively, loops (not shown) can be provided on the free ends of the shoulder straps 23 for receiving one or both straps 32 of a conventional lap belt.

Figure 3:
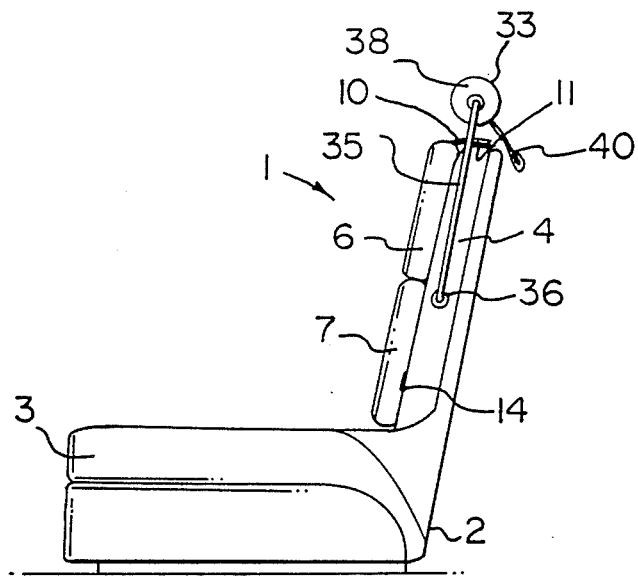
FIG. 3 is a schematic, side view of the automobile seat and the device of FIG. 1 in the stored position.

A combination chest protector and armrest 33 completes the device. The armrest 33 is defined by a generally C-shaped metal tube 35, the ends of which are pivotally connected to the automobile seat backrest 4. The ends of the tube 35 extend into sleeves 36 containing helical springs (not shown) for biasing the tube 35 upwardly to the stored position (FIG. 3). One end of the spring is connected to the fixed sleeve 36, and the other end is connected to an end of the tube 35. A padded, cylindrical cushion 38 is provided on the center portion of the tube 35. The cushion 38 is covered with vinyl or a fabric. The armrest 33 is retained in the use position by a strap 40. One end of the strap 40 is permanently attached to the tube 35 at the center of the cushion 38. A loop is provided on the other end of the strap 40 for releasably connecting the latter to the buckle socket 27 (FIGS. 1 and 2). Triangular panels 41 extend between the inner top ends (in the use position) of the cushion 7, and the bottom ends of sides of the recess 8 for defining seat sides.

Figure 5:
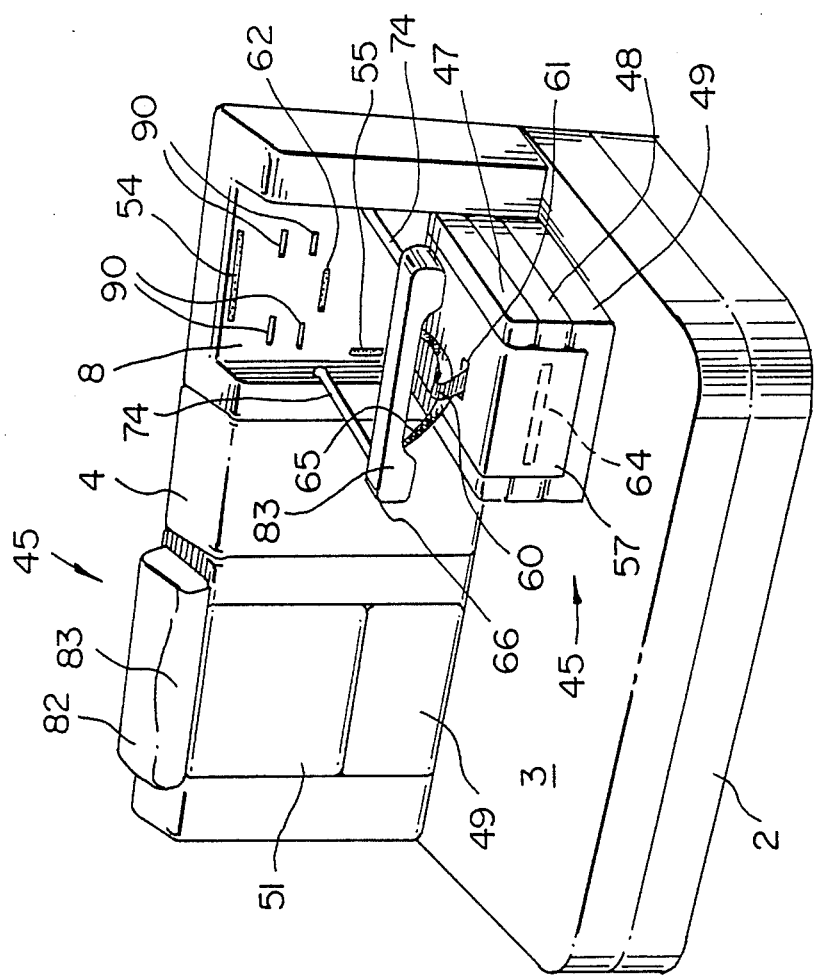
FIG. 5 is a schematic, perspective view of a conventional automobile seat incorporating two devices in accordance with the second embodiment of the invention.
Figure 6:
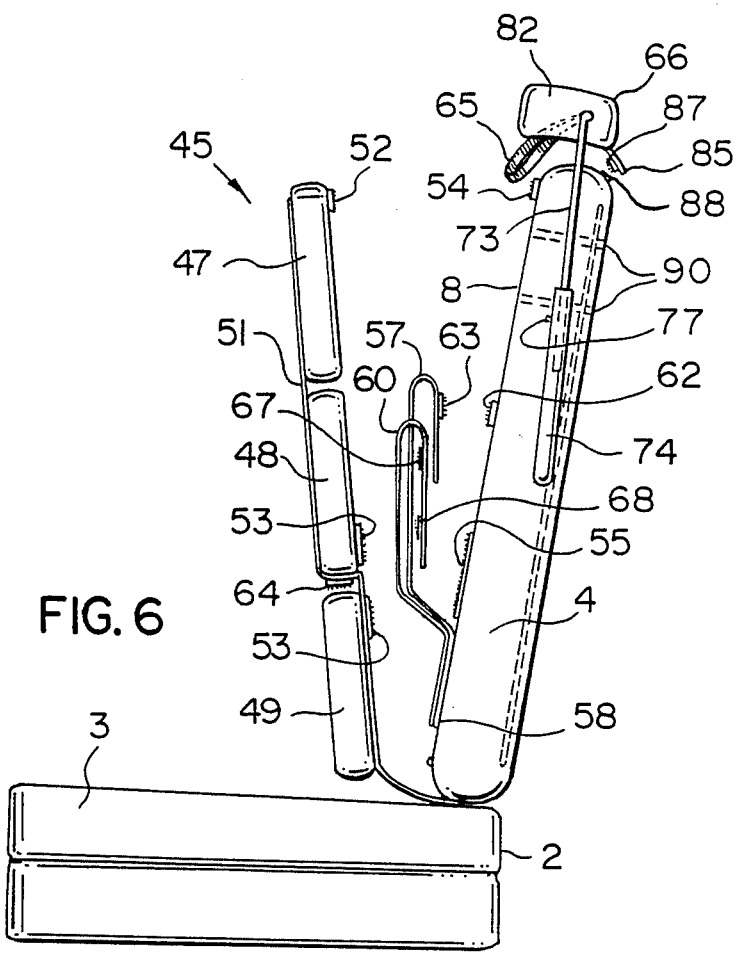
FIG. 6 is a schematic side view of the automobile seat and device of FIG. 5 between the use and stored positions.
Figure 7:
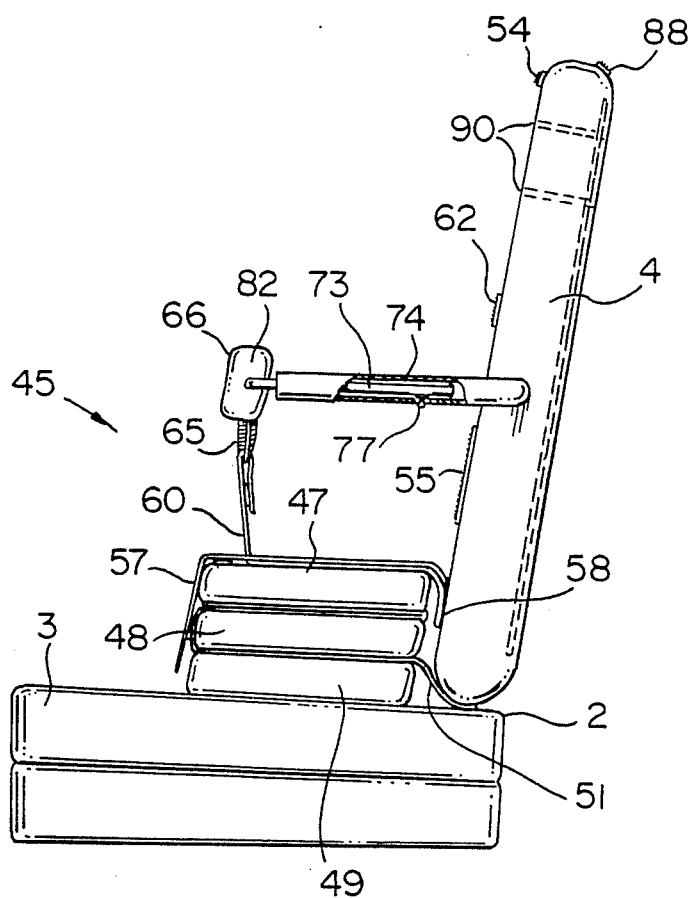
FIG. 7 is a schematic, partly sectioned side view of an automobile seat and the device of FIG. 5 in the use position.

With reference to FIGS. 5 to 7, as is the case with the device of FIGS. 1 to 3, the second embodiment of the device of the present invention which is generally indicated at 45 is intended for use on a conventional automobile seat 2 of the type including a seat portion 3 and a backrest 4. The device 45 replaces a portion of the backrest 4 and in the stored or non-use position (on the lefthand side of FIG. 5) is more or less completely housed in the backrest 4.

The seat device 45 is defined by three cushions 47, 48 and 49, which are hingedly interconnected in end-to-end relationship to fill a recess 8 in the backrest 4 when the device is in the stored position. The cushion 47, 48 and 49 are hingedly interconnected by a strip 51 of fabric which extends along the outer surfaces of the top two cushions 47 and 48 when in the vertical position, between the cushions 48 and 49 and along the inner surface of the cushion 49 to the junction between the seat 3 and backrest 4, where the strip is connected to the automobile seat. The outer surfaces of the cushions 47, 48 and 49 (in the stored position) have profiles matching the eat profile, i.e. the cushions have the same shape as the front surface of the backrest 4, so that the cushions can be used as a backrest. The cushions are retained in the stored position by a catch defined by mating VELCRO strips 52 and 53 on the inner surfaces of the cushions 47, 48 and 49, and 54 and 55 on the rear surface of the recess 8 in the backrest 4. In the use position (FIG. 7), i.e. when using the device as a child's car seat, the lowermost VELCRO strips 53 are interengaged by the folding of the cushions 48 and 49 together to hold the cushions in the use position.

The device is moved from the stored position to the use position by folding the cushions 49 forwardly and downwardly. The cushion 48 follows and folds downwardly and rearwardly into overlapping relationship with the cushion 49. Finally, the cushion 47 is folded forwardly and downwardly into overlapping relationship with the cushion 48 to define a seat. A seat cover 57 is normally stored in the recess 8 between the backrest 4 and the seat device 45. The bottom end 58 of the cover 57 is connected to the backrest 4. A strap 60 is also connected to the backrest 4 on the center of the cover 57, and extends through an opening 61 in the cover 57. In the stored position, the free ends of the cover 57 and the strap 60 are folded downwardly and inwardly, and are retained in such position by VELCRO tabs 62 and 63 on the backrest 4 and the cover 60, respectively. When the seat device is in the use position, the cover 57 extends over the top cushion 47. A VELCRO strip 64 is provided on the outer front end of the cushion 48 for mating with the tab 63 to secure the cover 57 in position (FIGS. 5 and 7). The strap 60 extends beneath the cover 57, and is passed around a strap 65 looping downwardly from a safety bar 66, which acts as a combination chest protector and headrest. VELCRO strips 67 and 68 are provided on the straps 60 for retaining the strap in the use position around the strap 65.

Figure 8:
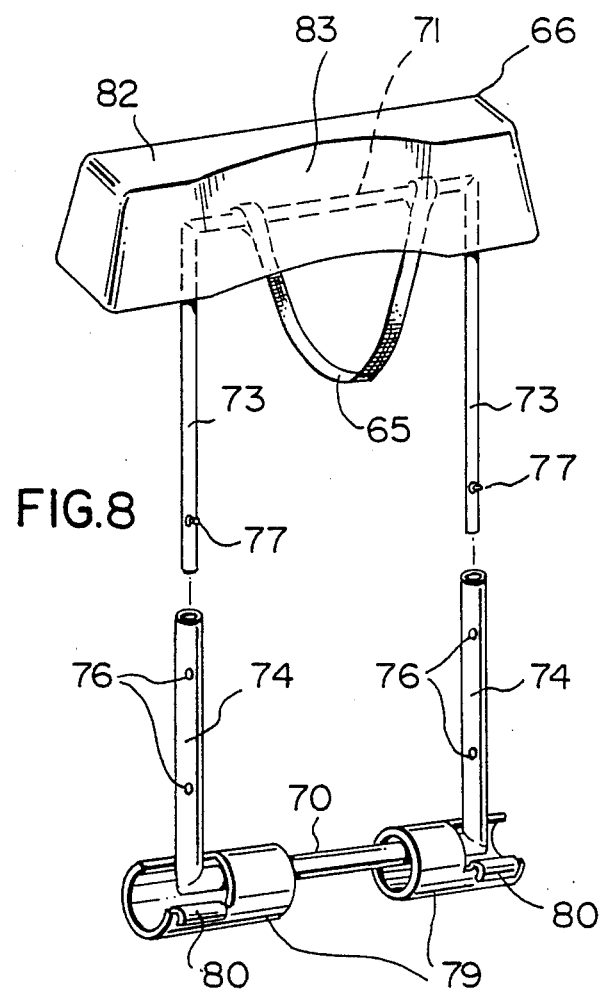
FIG. 8 is a schematic, perspective view of a combination headrest and armrest used in the device of FIGS. 5 to 7.

As best shown in FIG. 8, the safety bar 66 is defined by a U-shaped bottom frame 70 which is mounted in the backrest 4 of the seat, and a smaller diameter, generally U-shaped top frame 71, the arms 73 of which are telescopically mounted in the arms 74 of the bottom frame 70. A pair of apertures 76 are provided in each arm 74 for receiving buttons 77 in the arms 73. The buttons 77 are spring mounted, so that they can be depressed to telescope the frame 71 with respect to the frame 70. Sleeves 79 surround the bottom ends of the crossbar of the frame 70. The sleeves 79 are mounted in the backrest 4. Segments are removed from the outer ends of the sleeves 79 permitting rotation of the arms 74 in such sleeves. Plastic strips 80 are provided on the bottom edge of the cut out portions of the sleeves 79. The strips 80 act as stops for the arms 74. The strap 65 is connected to the top frame 71 inside of a cushion 82. The front surface of the cushion 82 includes a depression 83 for the head of a user when the safety bar 66 is in the vertical or headrest position. A short strip of material 85 (FIG. 6) extends outwardly from the rear center of the cushion 82. The strip 85 carries a VELCRO tab 87 for mating with a similar tab 88 on the top rear of the seat backrest 4 for retaining the safety bar 66 in the vertical or headrest position.

As shown in FIGS. 6 and 7, when the safety bar 66 is used as a headrest, the arms 73 are in the extended position with respect to the arms 74. In the chest protector position the arms 73 are retracted into the arms 74. A vinyl cover not shown) and a cushion material is provided on the arms 74, so that such arms 74 can be used as armrests when the safety bar 66 is in the horizontal position (FIG. 7). Slots 90 are provided in the backrest 4 for receiving a shoulder strap or harness of the type illustrated in FIG. 4. Another form of shoulder harness which can be used with the seat of the present invention while the safety bar 66 is retained in the headrest position is illustrated in FIG. 9. The shoulder strap of FIG. 9 includes a single rear strap 92 with a buckle 93 for connecting the harness to a strap 94 bolted to the floor or another fixed part of an automobile. A pair of shoulder straps 96 are connected to the strap 92 and extend through loops 97 which form part of a seat frame. Alternatively, the straps 96 can be passed through slots 90 in the backrest 4. The shoulder straps 96 are releasably interconnected in the chest area by a chest strap 98 carrying snap fasteners 99. Loops 100 are provided on the front or outer free ends of the straps 96 for receiving a conventional seatbelt of the type equipped with a buckle 103 and a stop 104. The strap 60 is connected to the seatbelt 102 between the loops 100 of the straps 96. The outer free ends of the straps 96 are folded over on themselves and sewn together to form a loop 100 and additional loops 106, whereby the position of the chest strap 98 can be vertically adjusted.

It will be appreciated that with sleeves 79 permanently mounted in the seat backrest 4, springs (not shown) can be provided between the frame 70 and the sleeves 79 for automatically returning the safety bar 66 to the headrest position, upon release from the chest protector position.

Thus, there has been described a relatively simple child's seat device for use in an automobile which is readily stored in a non-use position, so that the automobile seat can be used by an adult without removing the child's seat. It will be appreciated that the panels 41 can be omitted without adversely affecting the efficacy of the device.

What I claim is:

1. A collapsible child's seat device for use in a conventional automobile seat of the type including a seat portion and a backrest, said device comprising a plurality of panel means for defining a child's seat and a backrest; an elongated strip of fabric pivotally interconnecting said panel means in end-to-end relationship to each other in the stored position, in which said panel means are disposed in a recess in the automobile seat backrest and define a planar front portion of such backrest, one end of said strip being pivotal connected to the automobile seat at the junction between the seat portion and the backrest, whereby said panel means can be folded into overlapping relationship in the use position in which the panel means is folded onto the automobile seat portion to define a child's seat raised above the level of the automobile seat portion; first catch means on the top free end of said panel means and on the backrest for releasably retaining said panel means in the stored position; cover means attached at one end to the seat backrest for extending over said panel means in the use position; cover means and crotch strap means attached at one end to the seat backrest; said cover means and said crotch strap means being covered by said panel means in the stored position; and first connector means on said backrest releasably connecting the other end of each said cover means and crotch strap means to the backrest while in the stored position; in the use position said crotch strap means extending over said panel means beneath said cover means and through the cover means near the front thereof whereby the other end of the crotch strap may be connected to a conventional vehicle seat belt.

2. A device according to claim 1, including safety bar means for pivotal connection to the automobile seat backrest above the seat portion, said base means being rotatable between the stored position in which the safety bar means extends vertically around the top end of seat portion and the use position in which the safety bar means extends around the child above the panel means from one side to the other thereof.

3. A device according to claim 2, including second catch means on the backrest near the bottom end thereof for cooperating with a panel means portion of said first catch means for releasably retaining the panel means in the use position.

4. A device according to claim 2, including buckle means connected to and normally located in said panel means, in the use position said buckle means being exposed between the legs of the child for receiving the free ends of conventional shoulder straps mounted on the backrest.

5. A device according to claim 4, including strap means connected to said safety bar means for releasable coupling to said crotch strap means to secure the safety bar means in the use position.

6. A device according to claim 5, wherein said safety bar means includes a substantially C-shaped rod, ends of which are adapted to be pivotally mounted in the backrest of the automobile seat; and cylindrical pad means mounted on the center of said rod means for protecting a child in the use position.

7. A device according to claim 2, wherein said safety bar means includes a substantially C-shaped rod, ends of which are adapted to be pivotally mounted in the backrest of the automobile seat, and pad means on the center of said rod for use as a headrest when the rod extends around the top of the backrest portion of the automobile seat, and for protecting a child in the use position.

8. A device according to claim 7, wherein said safety bar means includes a pair of opposed, telescopically interconnected, generally U-shaped frames permitting adjustment of the length of said safety bar means.

9. A device according to claim 1, including second connector means on said panels for releasably retaining said cover means in the use position.

* * * * *